United States Patent [19]

Lin et al.

[11] Patent Number: 4,549,007
[45] Date of Patent: Oct. 22, 1985

[54] DIAMINE/DIOL CHAIN EXTENDER BLENDS FOR RIM PROCESS

[75] Inventors: I. Sioun Lin, Oak Ridge; Stanley J. Gromelski, Jr., West Caldwell, both of N.J.; Jesse Werner, New York, N.Y.; Michael J. Brown, Randolph Township, Morris County, N.J.; Paritosh M. Chakrabarti, Pittsburgh, Pa.

[73] Assignee: GAF Corporation, Wayne, N.J.

[21] Appl. No.: 672,211

[22] Filed: Nov. 16, 1984

Related U.S. Application Data

[60] Division of Ser. No. 506,250, Jun. 23, 1983, Pat. No. 4,523,004, which is a continuation-in-part of Ser. No. 406,756, Aug. 9, 1982, abandoned.

[51] Int. Cl.$^4$ .................. C08G 18/32; C08G 18/14; B29H 7/20
[52] U.S. Cl. .................................. 528/76; 252/182; 252/188.31; 264/54; 264/328.6; 521/163; 528/64
[58] Field of Search .................. 528/76; 521/163

[56] References Cited

U.S. PATENT DOCUMENTS

| | | | |
|---|---|---|---|
| 3,752,790 | 8/1973 | McShane et al. | 528/63 |
| 4,002,584 | 1/1977 | Takahashi et al. | 260/75 NH |
| 4,048,105 | 9/1977 | Salisbury | 260/2.5 AC |
| 4,218,543 | 8/1980 | Weber et al. | 528/52 |
| 4,254,272 | 3/1981 | Chung et al. | 528/64 |
| 4,296,212 | 10/1981 | Ewen et al. | 528/76 |
| 4,324,867 | 4/1982 | Patton et al. | 528/76 |

*Primary Examiner*—Herbert S. Cockeram
*Attorney, Agent, or Firm*—Marilyn J. Maue; Joshua J. Ward

[57] ABSTRACT

A chain extending agent for reaction injection molding (RIM) comprising a normally liquid blend of butanediol and a toluene diamine mono-substituted with an electron withdrawing group and having the formula

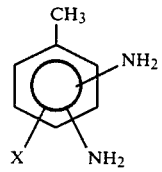

wherein X is vicinal to an amino radical and is selected from the group of halogen, CN, $NO_2$, acyl, carboxylate and isomeric mixtures thereof, and wherein the butanediol and diamine are combined in a critical mole ratio of from 4:1 to about 19:1. The above blend is particularly useful in the preparation of large moldings of polyurethane-polyurea elastomer by the RIM or RRIM (reinforced reaction injection molding) process wherein instant preformed blend is added to a mixture of polyol reactant and catalyst before polymerization in the mold with isocyanate to produce a urethane/urea polymer product of improved properties. Accordingly, the invention also concerns an enhanced RIM or RRIM process and improved product by the use of a mixture of the present chain extender blend and polyol reactant maintainable in the liquid state at ambient temperature.

7 Claims, No Drawings

DIAMINE/DIOL CHAIN EXTENDER BLENDS FOR RIM PROCESS

This is a division of application Ser. No. 506,250, filed June 23, 1983, now U.S. Pat. No. 4,523,004, which in turn is a continuation-in-part of application Ser. No. 406,756, filed Aug. 9, 1982, and now abandoned.

BACKGROUND OF THE INVENTION

This invention relates to an improved chain extender blend of critical proportion such that its liquid state is maintained at room temperature for direct mixing with a polyol reactant at ambient temperature and the chain extending profile of the blend is suitable for large mold reaction injection molding. The invention is particularly directed to the preparation of urethane/urea polymer by the RIM or RRIM process the basic principles of which were developed in Germany by Bayer AG. Typically, this process has been used to produce elastomeric urethanes in molded parts employed in production of fascia for automobiles, recreational vehicles, manufacture of shoe soles and chemically resistant coating compositions. The RIM process involves the production of moldings having a good performance and superior processing efficiency by a one step process. Generally, it is carried out by introducing a reactive polymerizable mixture, based on compounds having several reactive hydrogen atoms, such as polyethers and polyesters having terminal hydroxy groups, and isocyanates, such as diphenylmethane diisocyanate, tolylene-2,4- and 2,6-diisocyanates or polymeric diphenylmethane diisocyanate or mixtures thereof, into a mold. The reaction mixture essentially contains the polyol and isocyanate reactants, a chain extender and catalyst.

The RIM method wherein the reaction mixture is rapidly polymerized in the mold is opposed to the substantially slower castable, process which involves a first isocyanate prepolymerization step, relatively long pot life of the prepolymer to afford time for mixing and reaction with polyol before molding and curing and demolding times of 20–40 minutes. Accordingly, chain extenders used in the castable process such as for example the polyhalogenated toluene diamines, methylene bis(2-chloro-aniline) must be slow acting to accommodate the requirements of the process.

As explained hereinafter the rapid mold polymerization which characterizes the recently developed RIM process has many advantages over the well known time consuming "castable" process. With the advent of (RIM) techniques, perfected in the mid 1970's, it became desirable to have fast acting systems. Therefore, it is not surprising that there are many different aromatic diamines known in the art ranging typically from the slow methylene bis(o-chloroaniline), to the intermediate polymethylene phenyldiamine, to the very fast methylene bis(aniline) and unhindered toluene diamine.

When polyurethane or polyurethane-polyurea forming ingredients are deposited or otherwise injected into a mold cavity, it is essential that a careful balance of polymer gel time versus the molded part size be maintained. A fast enough gel time is necessary so that good polymer formation together with quick demold time is possible. Contingently, the gel cannot be so fast that polymer gelatin is occurring on the mold walls or floor while ungelled reactants are still entering the mold. Accordingly, the polyurethane or polyurethane-polyurea polymer must have suitable reaction profiles which can be varied or adjusted by chain extenders to meet the particular needs of the RIM process.

The RIM reaction mixture of polyol, isocyanate and chain extender is characterized by very fast reaction profiles which can be too fast to fill large mold sizes before gelation begins to initiate. This difficulty is encountered with the toluene diamines devoid of electron-withdrawing groups, namely the unsubstituted or alkyl substituted toluene diamines. Attempts to continue injection of such polymer forming ingredients into a mold after gelation commences results in poor polymer flow causing rapid and excessive tool pressure build-up and the potential for the rupture of the tool. Although an increase in the speed of mixing and delivery of the reaction ingredients into the mold can overcome some of these difficulties, there is a practical limit above which laminar flow will be upset. This will result in voids and unequal distribution of polymer in the mold.

It is now discovered that extended elastomeric polyurethane-polyurea polymers, which are characterized by good hardness, tear, improved modulus properties and higher demold strengths, compared to prior art extended urethane/urea polymers, can be prepared by using certain aromatic diamine-diol extender blends in which the diamine is the minor component. With the incorporation of these blends, the polymer-forming reactants have reaction profiles fast enough to be suitable for rapid molding and demolding processes as in the RIM or RRIM applications, yet slow enough to enable the filling of large mold sizes before gelation can occur and thereby avoid the prior art problems noted above. The present blend is ideally suited to the large mold RIM or RRIM process due to its high activity with controlled gel time and facilitated incorporation into the reaction mixture at ambient conditions.

It is an object of the present invention to provide a commercially attractive process for the preparation of polyurethane/polyurea elastomer molds achieved by a RIM or RRIM process.

Another object of this invention is to provide a more efficient and economical chain extender blend for use in preparing molds, and effectively large molds, of polyurethane/polyurea elastomer by the RIM or RRIM process.

Another object is to provide a fast acting chain extender blend which, in admixture with polyol/isocyanate reactants, is not subject to gelation before the reaction mixture completely fills the mold.

Still another object is to provide a chain extender blend which remains liquid at room temperature and is more easily incorporated and uniformly distributed in the polyol/isocyanate reactant mixture before polymerization.

Another object is to provide a molded polyurethane/polyurea product having improved modulus, hardness and impact strength throughout the polymer product.

Still another object is to provide a molded polyurethane/polyurea product having more uniformly distributed cross-linked sites and uniform phase mixture.

Whenever the term "essentially" or "comprising essentially" or "consisting essentially" is used in the specification or in the claims, it is intended to mean that the operative steps or materials to which the terms refer are an essential part of that phase of operation, but that unspecified materials or steps are not excluded so long as they do not prevent the advantages of the invention from being realized.

THE INVENTION

According to the present invention there is provided an improved curing, chain extending agent which comprises essentially a normally liquid blend of butanediol and a toluene diamine mono-substituted with an electron-withdrawing group positioned vicinal to an amino group which components are combined within a critical mole ratio range of between 4:1 and 19:1, preferably between about 6:1 and about 12:1. Within this critical range, the aforesaid blended materials coact to provide greatly reduced mixing and curing temperatures while requiring minimal mixing and reaction time; more specifically a mixing time not exceeding 15 seconds and a molding time of not more than 60 seconds. Since the blend within this critical ratio range is liquid at room temperature, it also possesses the advantage of having a long shelf life as compared to unblended substituted toluene diamines which eventually crystallize on storage at ambient temperatures. Blends within the above critical range produce urethane/urea polymers having the highest tensile strength, modulus, flexibility, impact resilience and tear strength. The proportions of butanediol to diamine are critical in the present invention since, at a molar ratio of 3.9:1, the diamine starts to crystallize on being cooled to room temperature and polymers made from such blends are brittle. At a ratio of greater than 19 molar excess butanediol, the modulus and hardness of the polyurethane/polyurea product is greatly reduced and heat sag after 1 hour at about 110° C. is evidenced.

The mono-substituted toluene diamine (the diamine) component of the present blend is a compound having the structure

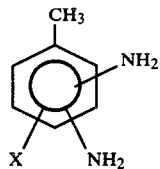

wherein X is an electron-withdrawing group and is positioned vicinal to an amino radical and further is selected from the group of halogen, CN, NO₂, acyl, carboxylate and isomeric mixtures thereof. Where X is an organic radical, it contains from 1 to 6 carbon atoms. Preferred of this group is the monochloro-toluene diamine which exists in three isomeric forms namely,

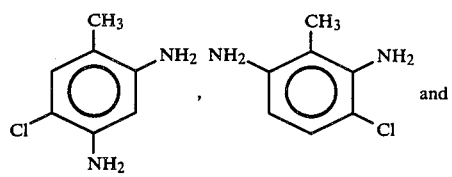

and

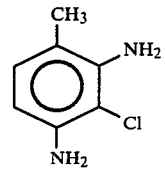

Although the isomers may be separated and used individually, it is preferred to avoid such expense and to employ the isomeric mixture which generally is comprised primarily of 5-chlorotoluene-2,4-diamine.

A convenient method of producing the chlorotoluenediamine of the present invention is described by the reaction of the commercially available mixture of toluene diisocyanates with chlorine in the presence of a catalyst such as ferric chloride. The resulting mixture of monochlorinated toluene diisocyanates is removed by vacuum distillation and hydrolyzed with aqueous sulfuric acid to give the desired mixture of chlorinated toluene diamines as a solid which can be removed by filtration and dried.

The nitro toluene diamines may be produced by procedures well known to those skilled in the art. For example, Ladenburg (Ber. 8, 1211) and Tiemann (Ber. 3 219) both describe procedures for synthesizing 5-nitro-2,4-diaminotoluene by the hydrolysis of 5-nitro-2,4-diacetylaminotoluene.

The carboxylated toluene diamines can typically be made by partial oxidation of substituted xylenes. For example, 4,6-dimethyl-m-phenylenediamine can be partially oxidized such that one of the methyl groups is converted into a carboxyl group. The carboxyl group can then be esterified by well known procedures.

The cyanotoluene diamines and acyl toluene diamines are made by standard literature procedures from the above mentioned carboxylated toluene diamines. For example, a carboxylic acid can readily be converted to an acid chloride and then to an amide by reaction with ammonia. The amide is then dehydrated to the cyano toluene diamine.

The above reactions can be carried out at a temperature between about 100° and about 150° C. for a period of from about 1 to about 6 hours. The above products are conveniently recovered by filtration.

In preparing the present blend, the solid diamine, is added to butanediol at elevated temperature, from about 98° C. to about 125° C. while mixing over a period of from about 0.5 to about 10 minutes; preferably at a temperature of from about 100° C. to about 110° C. under atmospheric pressure for a period of 1 to 10 minutes although lower mixing temperatures can be employed if desired. After a homogeneous blend is obtained, the mixture is cooled to ambient temperature at which the blend remains in the liquid state, without diamine crystallization even on storage at 20° C.

It is essential in this invention that the present blend be formed prior to contact with the polymerizable mixture, since crystallization and non-homogeneous problems occur when the polyol, diamine, butanediol and optionally catalyst are directly contacted at room temperature.

The improved liquid chain extender blend of the present invention may be added as a separate feed stream to the mixing zone; however it is most desirably incorporated in the polyol feed to the reaction mixing zone which is introduced simultaneously with a separate stream of isocyanate reactant; both feeds being separately monitored in closely controlled amounts to maintain a desired proportion.

The polyol feed stream may include a catalyst with the reactive dihydroxy compound and preferably the liquid chain extender blend. This feed stream may also contain blowing agent when a rigid foamed product is desired.

When employed, suitable catalysts are preferably selected from the group of organic metal compounds known for use in polyurethane chemistry, for example, organic tin (II) salts of carboxylic acids such as the acetate, octoate, ethyl hexoate or laurate salts of tin (II) and the dialkyl tin salts of carboxylic acids such as dibutyl tin diacetate, dibutyl tin dilaurate, dibutyl tin maleate and dioctyl tin diacetate, either alone or as a complex with amines such as 2,3-dimethyl-3,4,5,6-tetrahydropyrimidine or 2-methyl-3-cyclohexyl-3,4,5,6-tetrahydropyrimidine, aminopyrimidines, aminopyridines, hydroazinopyridines, or hydroazinopyrimidines and catalysts described in German Offenlegungsschrift Nos. 2,434,185; 2,601,082 and 2,603,834. Tertiary amino catalysts, as well as primary and secondary amino catalysts and mixtures thereof are highly desirable. Examples include dibutyl dilaurate tertiary amine, triethyl amine, tributyl amine, N-methylmorpholine, N-ethylmorpholine, N,N,N',N'-tetramethylethylene diamine, N-cocomorpholine, N-methyl-N'-dimethylamino ethylpiperazine, N-methylpyrrolidone, N,N-dimethylbenzylamine, bis-(N,N-diethylamino-ethyl)-adipate, N,N-diethylbenzylamine, pentamethyl diethylene triamine, N,N-dimethylcyclohexyl amine, N,N,N',N'-tetramethyl-1,3-butanediamine, N,N-dimethyl-β-phenylethylamine, 1,2-dimethylimidazole, 2-methylimidazole and 1,4-diaza-bicyclo-(2,2,2)-octane. A preferred catalyst of this group is dibutyl dilaurate tetraamine. Other suitable catalysts which can be used include triethanol amine, triisopropanol amine, N-methyldiethanol amine, N-ethyldiethanol amine and N,N-dimethyl-ethanol amine and amines having carbon-silicon bonds as described in German Pat. No. 1,229,290. The catalysts, when used, are generally employed in an amount of from about 0.01 to 10% by weight and preferably from 0.05 to 1% by weight based on the polyol compound.

The polyol reactants include diols, triols, glycerols, sugar alcohols having the formula $HOCH_2(CHOH)_{2-5}—CH_2OH$, polyalkylene ether glycols e.g. $HOCH_2(CH_2CH_2O)_nCH_2OH$ and polyester glycols e.g. $HOCH_2(RCOO)_nCH_2OH$. Generally, the polyether glycols can be prepared by the polymerization of cyclic ethers, such as tetrahydrofuran or epoxides or by the addition of epoxides to glycols, dihydroxyethers, dihydroxythioethers, dihydric phenols and the like by known methods. Ethylene oxide/propylene oxide based polyether polyols and polyether polyols containing about 10% acrylonitrile and about 10% styrene are used for high resiliency. Polyalkylene ether glycols suitable for the preparation of polyurethane should have a molecular weight of at least 400 and as high as 12,000. Molecular weights of about 750 to 3000 are preferred. Optionally, glycols having molecular weights of less than about 350 can be added to higher molecular weight glycols. These low molecular weight glycols can be used in proportions of about 0.5–3.0 moles per mole of polyether glycol, but the exact proportions are determined by the desired physical properties of the final products.

Representative non-polymeric glycols are those having the formula HO—R—OH, wherein R is a saturated, unsaturated, branched, linear or cyclic alkylene, oxyalkylene or hydroxyalkylene or is aryl optionally substituted with hydroxylated lower alkyl. Such non-polymeric glycols include ethylene glycol, 1,2-propylene glycol, 1,2-butylene glycol, 1,3-butanediol, 1,4-butanediol, 1,5-pentanediol, 1,10-decanediol, 3-cyclohexene-1,1-dimethanol, diethylene glycol, dipropylene glycol, N,N-bis(2-hydroxypropyl) aniline, and the like. Mixtures of these, as well as the alcohols described below, can be employed.

Polyester polyols can be based on polyester glycols, such as poly(ethylene adipate), poly/ethylene/propylene adipate), poly(ethylene glutarate), and poly(ethylene pimelate). Polyester glycols suitable for the preparation of polyurethanes can be made by several alternate routes, such as condensation of a dicarboxylic acid with an excess of a diol, transesterification of a dicarboxylic acid ester of a lower alcohol with a diol, or reaction of dicarboxylic acid dichloride with diol, optionally in the presence of a proton acceptor. Aliphatic dicarboxylic acids and alkanediols are preferred because of the desirable physical properties of the final products. However, aromatic dicarboxylic acids, such as terephthalic acid, and dihydric phenols, such as hydroquinone or resorcinol, also can be used in the preparation of polyester glycols suitable for reacting with isocyanates. Generally, the above described polyester glycols should have a molecular weight of 400–7000, preferably a molecular weight of 750–5000.

The mole ratio of polyol to blended chain extender in the present process is within the range of between about 0.01:1 and about 0.9:1, preferably between about 0.5:1 and 0.05:1. Generally the higher the amount of chain extender the higher the flexural modulus in the polyurethane product. It is most preferable to employ chain extender in an amount sufficient to supply a favorable phase balance between soft and hard segments in the finished product. Such a balance is achieved when incorporating between about 5 and about 50 weight % of chain extender blend based on polyol/isocyanate reactants.

The diisocyanate reactants of the present process include aromatic compounds such as diphenylmethane diisocyanate; phenylene diisocyanate; 2,4-toluene diisocyanate and its isomers; 1,5-naphthalene diisocyanate; methylene bis(4-phenylisocyanate); 4,4-biphenylenediisocyanate; 1,3,5-benzene triisocyanate; polymethylene polyphenylisocyanate, hexamethylene diisocyanate, etc. and aliphatic polyfunctional isocyanates such as hexamethylene diisocyanate; 1,4-cyclohexane diisocyanate and methylene bis(4-cyclohexaneisocyanate). Other suitable polyisocyanates are those described in U.S. Pat. Nos. 2,683,730 and 3,362,979 and British Pat. No. 1,534,258, pages 4–5, having a functionality of 2.2–3.5, and mixtures of the above isocyanates. Of the above examples, diphenylmethane diisocyanate is a preferred reactant.

An important factor in the process of the present invention is the ratio of isocyanate reactant to the polyol mixture, or isocyanate index number which is the total number of equivalent of isocyanate units divided by the total number equivalent of polyol and chain extender units, multiplied by 100. The isocyanate index employed in the present reaction is between 95 and 150, preferably between 100 and 110. Normally, excess isocyanate can lead to the formation of allophanate by-product impurity. However, in the present system, allophanate impurity is substantially eliminated.

After the reactant streams are prepared, they are monitored into the mixing zone or mixing head in predetermined amounts and subjected to high speed mixing. In view of the high reactivity of the two starting components, residence time in the mixing zone must be controlled to less than 15 seconds. To achieve such rapid mixing high pressure metering pumps under from about 1000-3000 psi are commercially employed to introduce reactant feed streams into the mixing zone. Using the liquid chain extender blend of the present invention, which facilitates incorporation of the liquid polyol mixture, residence in the mixing head can be reduced to 0.5 to 15 seconds; more specifically, to 10 seconds for hand mixing and from 0.5 to 3 seconds for impingement mixing. Heretofore the mixing of the reactants containing a diamine chain extender was effected at temperatures above 100° C., i.e. 120°-130° C. By the use of the present blend, mixing and curing at much lower temperatures for example 20° C. to 75° C., can be employed without developing tack, although conventional higher temperatures may also be used without detriment. The mixture is then pressured directly into the mold cavity generally under pressures, up to 3,000 psi if desired, to eliminate any air entrapment. After the mold is filled it is sealed or clamped and the pressure therein falls off to between about 20-60 psi.

The present improved chain extender blend permits completion of molding after injection with a residence time of not more than 60 seconds, more often within 20 to 40 seconds.

The molds are pre-treated with silicone release agents to facilitate removal of the formed product when the mold is opened. Rapid demolding time enables high output rates to be achieved. Upon release, the product ("plaque") of the present invention is found to have superior "green strength", elastic modulus, hardness, and thermostability while exhibiting flexibility, resistance to abrasion, impact and weathering. Since the mold is filled with a low viscosity liquid, intricate shapes are producible and exact duplication of the mold cavity is achieved without concomitant stresses, warpage or cracking.

From the above disclosure, it is apparent that the present blend is directed to a RIM or RRIM process.

Specifically, the RIM process comprises separate feeding of isocyanate and polyol mixture under very precise control with high-pressure metering pumps into a mixing head or impingement mixer where the liquid streams are mixed at high velocity for a very short period (e.g. 0.5-10 seconds) and immediately thereafter injected into a mold where polymerization and curing occurs within a period of from 5 seconds to 1 minute in the mold, which is very short for polyurethane materials. An alternative method of mixing utilizes piston displacement of the liquids at controlled rates to meter the reactants into the mixing head.

Typically, the mixing head is self-cleaning and mounted on the mold. It contains a relatively small, usually cylindrical, mixing chamber of the static impingement type where the liquid streams are mixed. The head usually has a valving mechanism that directs into the mixing chamber where the reaction mixture is formed. The head usually has a piston to clean the mixing chamber and seal the mold after the mixture is completed.

The mold functions as a chemical reactor in which the polymer is formed. A variety of mold constructions have been used. Steel or aluminum are preferred for high-volume production. Molds made from epoxy-reinforced nickel shells, machined or cast aluminum alloy and cast zinc alloy, e.g. kirksite are also useful. For prototype parts, reinforced epoxy or sprayed metal molds offer a relatively inexpensive option in commercial equipment. The mold is associated with a simple after mixer, a runner, and a gate. The cross-sectional area of the gate should be designed to insure laminar flow into the mold cavity, since turbulent flow can result in splashing and entrainment of air bubbles. Controlled venting of air from the mold is essential to avoid trapped air as the reaction mixture enters. Between loads, the mold is sprayed with a suitable release agent as detailed above, specifically designed for use in the RIM or RRIM process such as a silicone release agent.

After entering the mold, the expanding reaction mixture exerts sufficient pressure to fill the mold. Reactivity is very fast with mold residence times as short as 30 seconds or less and load to load molding cycles as low as 30 seconds to 2 minutes. Pressure within the mold normally does not exceed 100 psi. Part thickness normally ranges from 0.100 to 0.150 inches and density from 50 to 70 lb. cu. ft. Because RIM involves the injection of liquid non-polymeric reactants into the mold, its inherent advantages over other high-speed plastic processing techniques include:

(1) Lower temperatures; generally injection of reaction liquid streams are in the range of 20° to 75° C. and mold temperatures range beween 20° to 75° C. Since the reaction is exothermic, little added heat is required.

(2) Lower pressures. The in-mold pressure normally is less than 50 psi, requiring less clamping force than the other processes.

(3) Reduced energy consumption because of the low temperatures and pressures.

(4) Lower equipment costs. Capital investment for RIM machines is significantly lower because a liquid mixture and lower pressures are involved.

(5) Design flexibility. Production of large parts with complex shapes, variable wall thicknesses, ribbing, and bosses is facilitated by the RIM process. Since the reactants fill the mold as a liquid and then polymerize, there are no stresses molded into the parts.*

* Modern Plastics Encyclopedia 1979-1980, page 368

(6) 95% completion of polymerization-crosslinking in the mold, so that if any post cure is desirable to complete the polymerization crosslinking for slightly better strength, it is achieved in relatively short period eg. as little as 2-10 minutes in an oven.

The RIM technique can be used to make low modulus elastomers or high modulus elastomers, as desired. A more recent development is reinforced RIM in which RIM plastics are reinforced with a filler such as milled glass, wollastonite or other mineral fillers. These materials reduce the coefficient of thermal expansion and give the product high flexural modulus. A summary of the various types of RIM polyurethane-polyurea is presented in U.S. Pat. No. 3,314,962, columns 5-8.

Having thus generally described the present invention, reference is now had to the following example which sets forth preferred embodiments but which are not to be construed as limiting to the scope of the invention as more broadly set forth above and in the appended claims.

EXAMPLE 1

The following chain extenders were employed in a typical process for the preparation of cross-linked urethane/urea polymers by reaction injection molding in which a mole ratio of 0.0958:1 Niax 34-28 (a polyether polyol containing 10.9% acrylonitrile/10.1% styrene copolymer) to designated chain extender ($B_1D$ +CTDA), was employed.

Chain Extender A: a 1:1 Blend of 1,4-butanediol ($B_1D$) and chlorotoluenediamine (CTDA).
Chain Extender B: a 4:1 Blend of 1,4-butanediol ($B_1D$) and chlorotoluenediamine (CTDA).
Chain Extender C: a 6:1 Blend of 1,4-butanediol ($B_1D$) and chlorotoluenediamine (CTDA).
Chain Extender D: a 9:1 Blend of 1,4-butanediol ($B_1D$) and chlorotoluenediamine (CTDA).
Chain Extender E: a 19:1 Blend of 1,4-butanediol ($B_1D$) and chlorotoluenediamine (CTDA).
Chain Extender F: $B_1D$ alone.
Chain Extender G: CTDA alone.

The blends of the present invention were prepared by adding monochlorotoluenediamine (CTDA) to butanediol at about 100° C. and mixing for about 1 minute. The blended compositions were then allowed to cool to room temperature. Composition A and B on standing indicating some precipitation of the diamine. The diamine in all other blends remained in the liquid state. Composition E approaches composition F (1,4-butanediol without CTDA chain extender) but shows some improvement in tensile strength and hardness.

Seven glass beakers each containing 56.66 g of Niax 34-28 were set aside for separate incorporation of each of the above chain extenders A-G. The temperatures required to obtain a liquid mixture of chain extender and polyol mixture are reported in the Table. Where noted in the Table, a 1:1 liquid mixture of 0.034 g of dibutyltin dilaurate (T-12) and tertiary amine (Dabco 33-LV) was added to the polyol.

After, the polyol/chain extender mixtures were stirred for 1 minute they were rapidly hand mixed with 53.14 g of methylene diphenyl diisocyanate (Isonate 143 L) for 6 seconds to a homogenous mixture at a temperature required to maintain the liquid state as noted in the Table. The isocyanate index employed was 105. The homogenous mixture was immediately pressured under 1,000 to 3,000 psi into a preheated mold coated with a silicone release compound where at cure temperature the polyurethane-polyurea elastomer product is formed within 3 seconds and the resulting plaque removed from the mold.

The properties of the molded products are reported in the Table.

TABLE

| | CHAIN EXTENDER TESTED | | | | | | | |
|---|---|---|---|---|---|---|---|---|
| | A | B | C | D | D' | E | F | G |
| Reaction Conditions | | | | | | | | |
| Amount of Chain Extender | 19.97 g | 16.67 g | 16.13 g | 15.59 g | 15.59 g | 15.06 g | 14.52 g | 25.21 g |
| Niax Polyol 34-28* | 56.66 g | 56.66 g | 56.66 g | 56.66 g | 56.66 g | 56.66 g | 56.66 g | 56.66 g |
| Temp. of Mixing Niax 34-28 and Blends °C. | 22° | 22° | 22° | 22° | 22° | 22° | 22° | 100° |
| Catalyst added | 0.034 g of T-12# & Dabco 33-LV+ | 0.034 g of T-12 & Dabco 33-LV | 0.034 g of T-12 & Dabco 33-LV | 0.034 g of T-12 & Dabco 33-LV | — | 0.034 g of T-12 & Dabco 33-LV | 0.034 g of T-12 & Dabco 33-LV | — |
| Isonate 143L** | 53.14 g | 53.14 g | 53.14 g | 53.14 g | 53.14 g | 53.14 g | 53.14 g | 53.14 g |
| Temp. of mixing reactants °C. | 22° | 22° | 22° | 22° | 22° | 22° | 22° | 100° |
| Curing temp. °C. | 70° | 70° | 70° | 70° | 70° | 70° | 70° | 70° |
| | A | B | C | D | D' | E | F++ | G |
| Product Properties | | | | | | | | |
| Mechanical properties | Unable to obtain a suitable product (premature polymerization) | CTDA crystallized at room temp. | slightly brittle | excellent hardness and green strength | very brittle | acceptable hardness most flexible | good sample | unable to obtain a suitable product (premature polymerization) |
| Shore D Hardness | — | — | 62 | 62 | 24 | 61 | 55 | — |
| Tensile strength, psi. | — | — | — | 4422 | — | 3500 | 3334 | — |
| Elongation, % | — | — | — | 100 | — | 150 | 158 | — |
| Tear Strength, Die c, pli | — | — | — | 785 | — | 570 | 570 | — |
| Flexural Modulus, psi. $10^3$ | — | — | — | 82 | — | 40 | 38 | — |
| Heat Sag 1 hr. at 120° C., inch | — | — | — | 0.07 | — | 0.30 | 0.36 | — |
| Notched Izod Impact ft. lb./in, 75° F. | — | — | — | 13.50 | — | 12.0 | 11.8 | — |
| Density, lb./ft.$^3$ | — | — | — | 70 | — | 71 | 71 | — |

*Viscosity (R.T.) cps is 1958; 0.1% water (Union Carbide Corp.)
**Major amount of methylene diphenyl diisocyanate and a lesser amount of polycarbamide adducts; isocyanate content is 29.3%; viscosity (R.T.) cps is 30 (Upjohn Co.)
Dibutyltin dilaurate; density is 65.63 lbs/ft$^3$ (M & T Chemical).
+Stable, non aqueous low viscosity tertiary amine; density is 63.75 lbs/ft$^3$ (Air Products Chemical Co.)
++Prepared in RIM machine Although the above examples were generally prepared by hand mixing, the RIM technique, involving mechanical injection into a mold, a precisely controlled high speed impingement mixer and metering devices for the separate reactant feed streams introduced into a mixing head, provides even better results with significantly reduced handling time under substantially the same operating conditions, temperatures and pressures.

EXAMPLE 2

The following example illustrates the preparation of polyurethane-polyurea elastomer molds obtained from the RIM technique using the present chain extender blend.

About 74 parts by weight of 4,4'-diphenylmethane diisocyanate (23 wt. % NCO) is introduced into feed Tank A and the following blended materials are introduced into feed Tank B at 32° C.

| parts by weight | Compound |
|---|---|
| 77.0 | Olin Poly G 55-28 (a polyether having OH #28) |
| 18.4 | 1,4-butanediol |
| 3.6 | monochlorotoluenediamine |
| 0.5 | dibutyltin dilaurate |
| 0.5 | triethylenediamine (33% soln. in 1,4-butanediol)* |

*ethylene glycol, propylene glycol or any other suitable inert solvent for triethylenediamine can be substituted for 1,4-butanediol.

The materials from feed Tank A and feed Tank B are simultaneously injected into the mixing head of the reaction injection molding equipment, in this case, the RIM machine supplied by Accuratio Systems Inc. operating under processing conditions of between about 2000-3000 psi material pressure dispensed through a hydraulically forced mixing head wherein countercurrent impingement mixing of the components takes place prior to rapid injection into a mold to form a plaque. In this case a steel mold is employed; although aluminum, fiberglass and other conventional mold materials are also suitable.

The material from the mixing head is fed into the mold through a sprue gate to fill from the long side of the mold which can be tempered at between about 25°-70° C.

The temperature of the mold is maintained at 65° C. for a gelation time of about 30 seconds, whereupon the resulting polyurethane-polyurea elastomer is released from the mold and is tempered at about 120° C. for one hour.

The molded product is uniformly and completely polymerized with no deformation or imperfections in the plaque. The molded plaque possesses excellent hardness and good flexibility with no detectable heat sag after curing.

It is to be understood that any of the blends of this invention e.g. Samples B, C, D and E above, can be substituted for the blend in Tank B of this example.

What is claimed is:

1. In a process for the production of polyurethane-polyurea elastomer moldings from a reaction mixture by a reaction injection molding process, wherein said reaction mixture comprises the components:
   (a) an isocyanate reactant;
   (b) a polyol reactant having molecular weight of from 400 to 12,000;
   (c) a chain extender; and
   (d) a catalyst;
the improvement wherein said chain extender is a normally liquid blend of butanediol and a mono-substituted toluene diamine having the formula

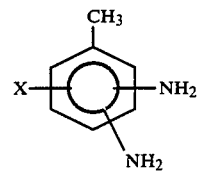

wherein X is vicinal to an amino radical and is an electron-withdrawing substituent selected from the group of halo, CN, $NO_2$, acyl and carboxylate and wherein the alkyl moieties of said acyl and carboxylate groups contain 1 to 6 carbon atoms, and isomeric mixtures of said mono-substituted toluene diamines, said blend formed of a mole ratio between about 4:1 and about 19:1 butanediol to said diamine and wherein said liquid blend is combined with said component (b) in a mole ratio of from about 1:0.01 and about 1:0.9 prior to contact with said component (a) and wherein components (a), (b), (c) and (d) are contacted for a period less than 1 minute in a high impingement mixing zone prior to pressurizing the contacted mixture into a mold maintained at polymerization temperature for a period of not more than 1 minute and recovering molded polyurethane-polyurea elastomer from said mold.

2. The process of claim 1 wherein the chain extender blend is a mixture of butanediol and a monochlorotoluenediamine combined in a mole ratio of between about 5:1 and about 12:1.

3. The process of claim 2 wherein the mole ratio of said blend with component (b) is between about 1:0.05 and about 1:0.5.

4. The process of claim 1 wherein the isocyanate index number is between about 95 and about 150.

5. The process of claim 1 wherein the components (a), (b), (c) and (d) are mixed at a temperature of from about 20° C. to about 75° C. and molded at the same or a higher temperature.

6. The process of claim 2 wherein said chain extender blend is employed in a concentration of at least 5% by weight of the polyolisocyanate mixture.

7. The product of the process of claim 1.

* * * * *